Sept. 1, 1964
D. F. BENNETT ETAL
3,147,431
APPARATUS FOR MEASURING AND RECORDING THE CONDUCTIVITY
OF SEA WATER AS A FUNCTION OF DEPTH
Filed July 10, 1961
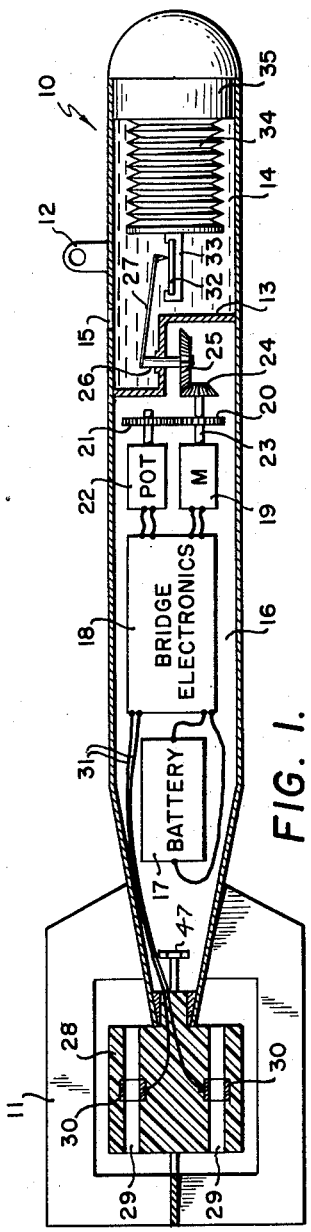
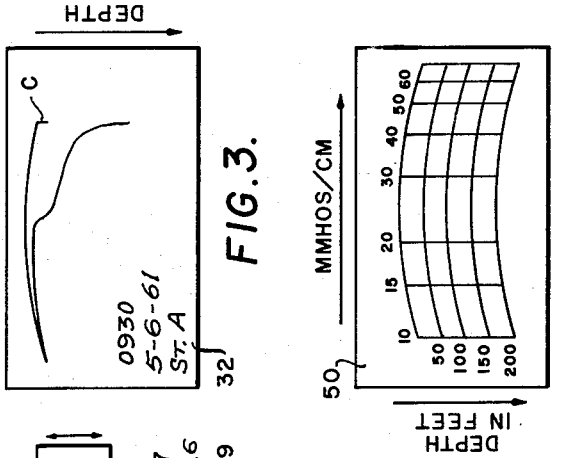
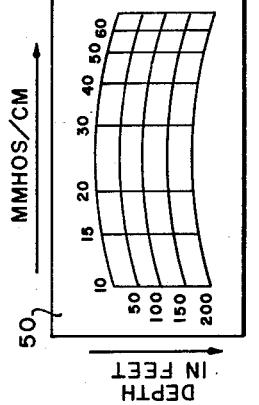
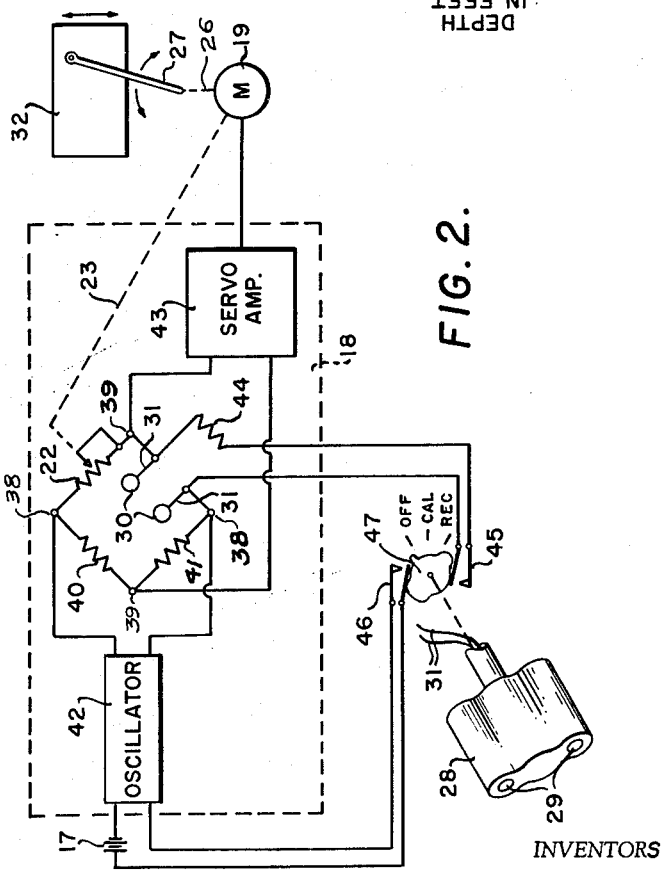
INVENTORS
DONALD F. BENNETT
EDWARD W. JOHNSON, JR.
BY *Rolla N. Carter*
ATTORNEYS

United States Patent Office 3,147,431
Patented Sept. 1, 1964

3,147,431
APPARATUS FOR MEASURING AND RECORDING THE CONDUCTIVITY OF SEA WATER AS A FUNCTION OF DEPTH
Donald F. Bennett and Edward W. Johnson, Jr., Panama City, Fla., assignors to the United States of America as represented by the Secretary of the Navy
Filed July 10, 1961, Ser. No. 123,069
1 Claim. (Cl. 324—62)
(Granted under Title 35, U.S. Code (1952), sec. 266)

The invention described herein may be manufactured and used by or for the Government of the United States of America for governmental purposes without the payment of any royalties thereon or therefor.

The present invention relates to apparatus for recording the conductivity of sea water as a function of depth, such an apparatus being herein designated a bathyconductograph. More particularly, the invention is concerned with obtaining sea water conductivity, as a function of depth, from a moving ship.

In connection with certain mine countermeasures operations, it is highly desirable to be able to make sea water conductivity measurements from a moving ship. The increasing interest and widespread activity in oceanography require rapid survey methods to obtain salinity data on a vast scale. The concept of determining salinity at sea from measurements of electrical conductivity and temperature has had great appeal to oceanographers at least as early as Nanson's Norwegian Polar Expedition in 1893. Most of the difficulties and shortcomings of instruments devised to practice this concept are attributable to complexity of instrumentation and sampling techniques.

Accordingly, an object of the present invention is to provide an apparatus for measuring sea water conductivity relative to depth, which conductivity and depth are recorded as two preferably rectangular coordinates on a chart or other record member.

Another object of the invention is the provision of apparatus with which the measurement of sea water conductivity gradients becomes a rapid, simple, underway operation.

Other objects of the invention, as well as the invention itself, will become apparent from the following description when read in connection with the accompanying drawing in which:

FIG. 1 is a side view in section of a bathyconductograph vehicle incorporating the invention;

FIG. 2 is a schematic diagram of the measuring and recording units;

FIG. 3 is a diagrammatic view of a bathyconductograph trace or recording; and

FIG. 4 shows diagrammatically a viewing grid for interpreting the trace of FIG. 3.

The preferred embodiment of the invention to be described in detail comprises a torpedo-shaped vehicle having a flooded forward compartment housing a depth sensing element which moves a record medium in one direction through a distance proportional to the hydrostatic pressure to which the element is subjected. An air-filled after compartment of the vehicle contains a conductivity bridge circuit whose output drives a null seeking servo system which rotates a recording stylus cooperating with the record medium through an angle which is a function of the value of conductivity, the movement of the stylus being orthogonal to and in the same plane as the movement of the record medium whereby the combined motion produces a trace of conductivity versus depth as the vehicle is lowered to the sea bottom and retrieved.

A bathyconductograph incorporating the invention is shown in FIG. 1 as comprising a torpedo-shaped vehicle 10 having stabilizing tail fins 11 and a towing eye 12. A water tight bulkhead 13 separates the vehicle 10 into a forward compartment 14 adapted to be free flooded through a port 15 and an after air-filled compartment 16 containing a battery 17, a bridge circuit 18, a bridge balancing mechanism including a servo motor 19 connected through gears 20 and 21 to drive a potentiometer 22 in the direction to balance the bridge 18. The motor driven gear 20 is carried by a shaft 23 which also is provided with a bevel gear 24 meshed with a stylus-driving bevel gear 25 secured to a vertical shaft 26 extending through the bulkhead 13 into the forward compartment 14. This shaft 26 carries a recording stylus 27 which is utilized to mark a record as hereinafter described. The tail fins 11 surround and serve to protect a conductivity cell comprised of a body 28 of insulating material provided with two spaced bores 29 extending approximately parallel to the axis of the vehicle 10 and containing approximately midway their lengths cell electrodes 30, which may be short lengths of metal tubing such as brass, but preferably silver-silver chloride, and connected through leads 31 to the bridge circuit 18. The cell electrodes 30 and the leads 31 may be potted in the body 28 when it is molded plastic. As will be described in connection with FIG. 2, the cell body 28 is rotatably mounted for the purpose of performing certain switching operations not shown in FIG. 1. In the flooded compartment 14, a record receiving member such as a metalized glass plate 32 is supported in marking relation to the stylus 27 by a record holding member 33 carried by a mechanical system which converts hydrostatic pressure into linear motion parallel to the axis of the vehicle 10. The depth sensing means shown in FIG. 1 is the same as presently employed in bathythermographs and comprises a gas-filled spring-loaded bellows 34 secured to a base member 35 mounted in the nose of the vehicle 10 for moving the record holder 33 axially of the vehicle 10 as a function of depth. The bellows 34 is preferably evacuated to reduce its sensitivity to temperature changes.

As shown in FIG. 2, the bridge circuit 18 includes the potentiometer 22 and the cell electrodes 30 connected in series with two resistances 40 and 41 to provide a bridge circuit having input terminals 38 and output terminals 39, the input terminals being driven by an oscillator 42 powered by the battery 17. The bridge output signal on terminals 39 is passed through a servo amplifier 43 to control the motor 19 to impart a nulling motion through the mechanical linkage 23 to the potentiometer 22. The null seeking rotation of the motor 19 is also transmitted through the shaft 26 to impart a corresponding angular movement to the stylus 27 for marking the record plate 32 which, as indicated by the double arrow, moves back and forth as regulated by the depth sensing bellows 34. A calibrating resistor 44 is arranged to be connected in parallel with the cell electrodes 30 by a pair of contacts 45 which are closed by a cam 47 when it is moved to the calibrating position, designated CAL, by rotation of the cell body 28. This cam 47 operates to close a pair of contacts 46 to connect the battery 17 to the oscillator 42 when the cam 47 is in either the calibrating position or in the recording position, designated REC. The calibrating resistor 44 is a precision resistor and is preferably chosen to have a value comparable to the conductivity values to be recorded, e.g., 40 millimhos/cm.

In use, a cable is connected to the towing eye 12, a record 32 is inserted in the holder 33 through an alined opening in the side of the vehicle 10 and the cell body 28 rotated to the CAL position to provide a mark of the calibration value on the record 32 and in doing so the depth scale will be zeroed. The upper curve on the record 32 as shown in FIG. 3 represents zero depth and a standard stylus deflection of 40 millimhos/cm. In order to accent this calibrating deflection, the bellows 34 may be manually compressed a short distance to provide the short vertical line C. The cell body 28 is next moved to REC position whereupon the stylus retraces its zero depth curve to its zero conductivity position at the left in FIG. 3. The vehicle is now streamed and towed at a depth of about 5 feet for 30 seconds to stabilize the recording mechanism at the surface conductance after which the tow cable is paid out freely while the vehicle dives to the required depth and then is retrieved. The record 32 is now removed from the retrieved vehicle and read through a specially prepared viewing grid 50 (FIG. 4) which is nonlinear for conductivity and linear for depth. The conductivity scale is preferably nonlinear for the reasons that a linear scale would require the equivalent of a special precision nonlinear potentiometer in the servo system and the nonlinear scale employed provides an error which is a constant proportion of the value of conductivity, i.e., the same degree of accuracy is provided throughout the scale.

The conductivity record depicted in FIG. 3 is read by placing it under the viewing grid 50 and oriented with its zero depth curve coinciding with zero depth and its calibration mark C coinciding with the conductivity value of 40 mmhos/cm. When thus oriented, the conductivity profile on the record 32 shows that the surface water had a conductivity of about 22 millimhos/cm. which at a depth of about 50 feet rapidly increased to 40 millimhos/cm. where it remained constant to the depth of nearly 200 feet. Although such a conductivity profile is rather unusual, it can prevail where a large source of brackish water, such as a bay, flows into the ocean without much vertical mixing. The legible information contained on the record slide 32 is generally placed thereon by the operator at the time the recording is made and, as shown in FIG. 3, it indicates the record was made at 0930 on May 6, 1961, at Station A.

In certain mine countermeasures operations, the primary interest is in the conductivity values and for these purposes the record provided is directly useful. On the other hand, oceanographers are primarily interested in salinity, which is a function of both conductivity and temperature, so that in ordinary oceanographic work the vehicle provided by the present invention will be used in conjunction with simultaneously taken temperature measurements, as with a bathythermograph, and the salinity values read off of prepared tables of the same general nature as steam tables and the like.

The fact that the vehicle 10 is self-sufficient in that it requires no electrical connections between it and the towing ship makes it possible to use a small diameter tow cable with a resulting decrease in drag which greatly improves the diving characteristics of the vehicle at moderately fast towing speeds. The practice of the invention provides a recording which presents the data in a favorable display where each of the variables required are recorded directly against each other thereby eliminating the transfer of data required when two variables are to be compared and each is plotted against a third variable, such as time.

It will be evident to those skilled in the art that the pressure sensing element may be a piston or an element based on the Bourdon tube principle and that the marking stylus may be made to move in a straight line if desired rather than along an arc of a circle.

The cell body 28 is preferably faired and located at the aft end of the vehicle 10 but it will be understood that the conductivity cell may be constructed and located otherwise as long as it functions to assure a rate of exchange of sea water through it consistent with the diving rate of the vehicle, e.g., average of 10 feet/sec. in a 200 foot dive.

While for the purpose of disclosing the invention a preferred embodiment thereof has been described in detail, it will be evident to those skilled in the art that obvious modifications may be made without departing from the invention, the scope of which is set forth in the appended claims.

What is claimed is:

In self-contained apparatus for measuring and recording sea water conductivity as a function of depth,
    a recording instrument including
        a movable record holder and
        movable means for marking a record in said record holder,
    hydrostatic pressure responsive means for moving said record holder relative to said marking means so that a record in said holder is marked,
    a conductivity bridge having an electrical output,
    a null seeking servomechanism connected to said output for controlling the movement of said marking means,
    a resistor having a predetermined conductivity value,
    electrical conductivity cell electrodes connected in an arm of said bridge, and
    switch means manually closable for connecting said resistor in parallel with said cell electrodes for producing an output of said bridge corresponding to said predetermined conductivity value,
    so that when the recording instrument is in air the closing of said switch means causes said marking means to move to an extent representative of said predetermined conductivity value and over a path with respect to said record holder representative of zero hydrostatic pressure to mark on a record in said record holder a calibration curve corresponding to said predetermined conductivity value.

References Cited in the file of this patent

UNITED STATES PATENTS

| | | |
|---|---|---|
| 2,579,220 | Vine | Dec. 18, 1951 |
| 3,075,143 | Douty | Jan. 22, 1963 |